J. A. BEIL & F. J. HOFF.
AUTOMOBILE LOCK.
APPLICATION FILED JUNE 7, 1918.
1,294,754.
Patented Feb. 18, 1919.
2 SHEETS—SHEET 2.
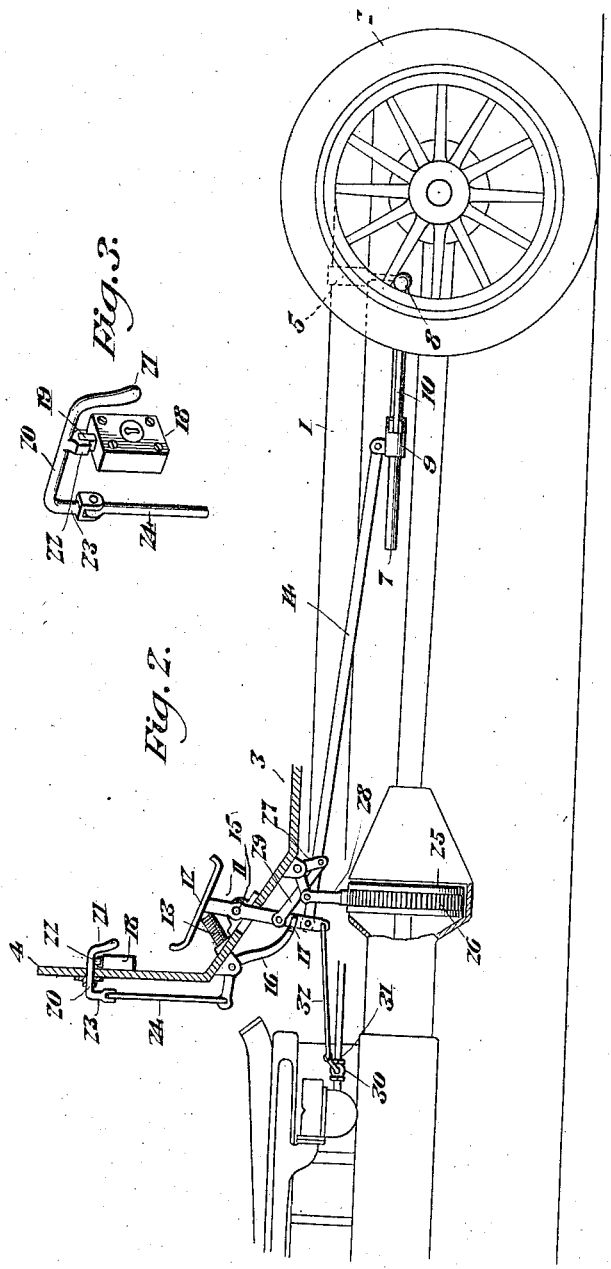
Inventors
J. A. Beil &
F. J. Hoff
By Victor J. Evans
Attorney
Witnesses

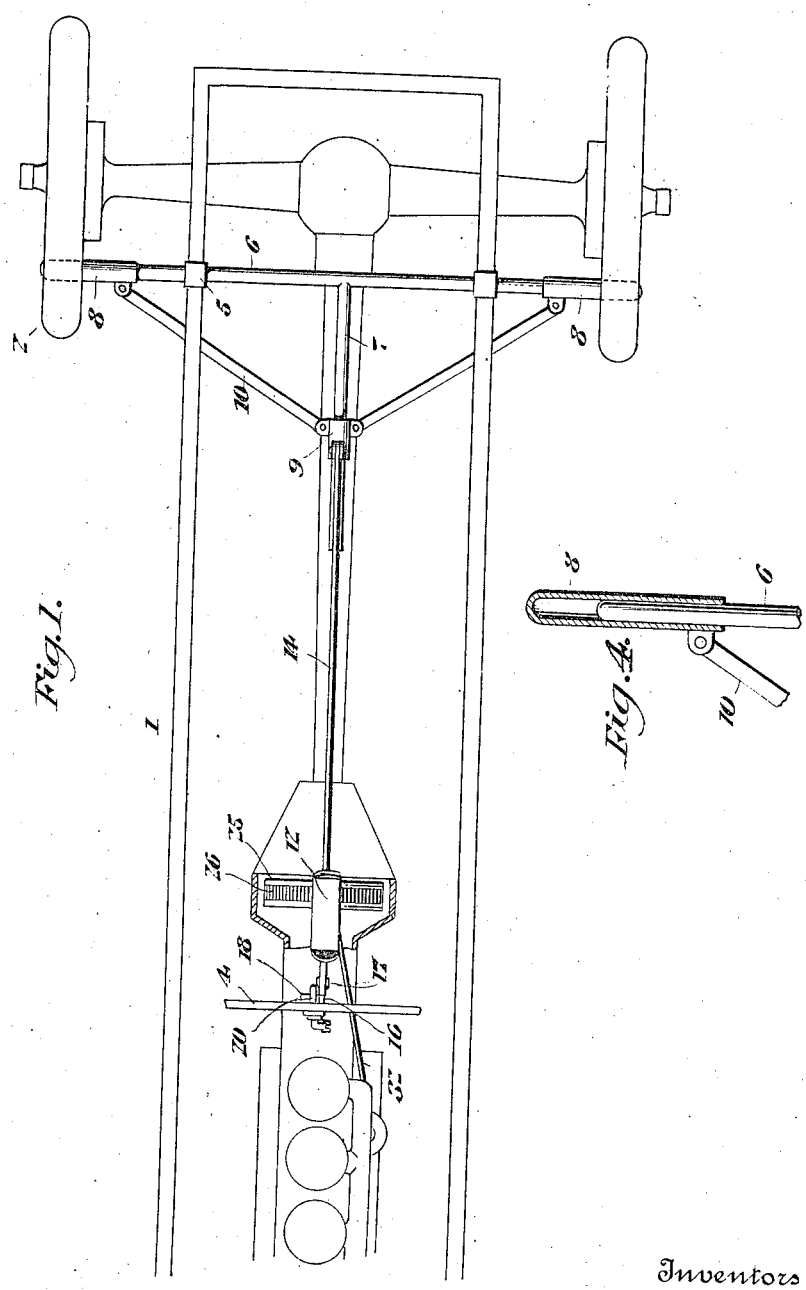

UNITED STATES PATENT OFFICE.

JOSEPH A. BEIL AND FRANKLIN J. HOFF, OF YOUNGSTOWN, OHIO; SAID HOFF ASSIGNOR, BY MESNE ASSIGNMENTS, TO WILLIAM J. STUPPY, OF SHARON, PENNSYLVANIA.

AUTOMOBILE-LOCK.

1,294,754.

Specification of Letters Patent.

Patented Feb. 18, 1919.

Application filed June 7, 1918. Serial No. 238,761.

*To all whom it may concern:*

Be it known that we, JOSEPH A. BEIL and FRANKLIN J. HOFF, citizens of the United States, residing at Youngstown, in the county of Mahoning and State of Ohio, have invented new and useful Improvements in Automobile-Locks, of which the following is a specification.

This invention relates to automobile locks and it consists in the novel features hereinafter described and claimed.

An object of the invention is to provide the lock of the character stated which is of simple and durable structure and which when applied to an automobile machine may be used effectually for locking or securing the operative parts of the machine at several different and distinct locations. For instance one feature of the invention is adapted to lock the rear wheel of the automobile machine, another feature is adapted to lock the propelling shaft and still another feature is provided for locking or interrupting the flow of gasolene or gas from the tank to the carbureter. All of these features are operated from a single foot treadle mechanism and a securing device may be provided at the dash board of the machine for maintaining the features hereinbefore stated at their locked positions during the absence of the owner of the machine.

In the accompanying drawings:—

Figure 1 is a plan view of the running gear of an automobile machine showing the lock applied.

Fig. 2 is a side view of the same.

Fig. 3 is a detail perspective view of part of the lock mechanism.

Fig. 4 is an enlarged sectional view illustrating the slidably mounted sleeve on the end of the cross bar.

As illustrated in the accompanying drawing the automobile machine may be of usual pattern and includes a frame 1 having rear driving wheels 2 and a body 3 provided with a dash-board 4.

Brackets 5 are secured to the rear portion of the frame 1 and the said brackets in turn support at their forward ends a crossbar 6. The ends of the bar 6 terminate in the vicinity of the inner sides of the rear wheels 2. The bar 6 is provided at a point between its ends with a forwardly disposed stem 7. Sleeves 8 are slidably mounted upon the end portion of the bar 6 and may be moved to position beyond the ends of the said bar whereby they are projected through the spaces between the spokes of the wheels 2.

A collar 9 is slidably mounted on the stem 7 and links 10 are pivotally connected at their inner ends with the said collar and pivotally connected at their outer ends with the sleeves 8 at points between the ends thereof.

Therefore it will be seen that when the collar 9 is moved from the stem 7 the sleeve 8 will be moved longitudinally along the bar 6, therefore they may be moved to projected positions with relation to the rear wheels or retracted positions with relation to the same. When at their projected positions the rear wheels are restrained against turning or rotation and when at their retracted positions the said wheels are free to rotate in a usual manner.

A standard 11 is pivotally mounted as at 15 at the forward portion of the bottom 3 and is forwardly and downwardly inclined. The standard 11 carries at its upper end a foot pedal 12 adapted to be used by the operator for swinging the said standard. A spring 13 is interposed between the floor of the body 3 and the underside of the treadle 12 and is under tension with a tendency to normally hold the treadle 12 at a rear position. A link 14 is pivotally connected at its rear end with the collar 9 and pivotally connected at its forward end with the lower portion of the standard 11. Consequently, it will be seen that when the standard 11 is swung the link 14 is moved longitudinally whereby the collar 9 is moved in a forward direction along the stem 7 and consequently the sleeves 8 are moved to retracted position upon the bar 6. Therefore the wheels 2 are unobstructed and may freely rotate.

A bell crank lever 16 is fulcrumed under the forward portion of the body 3. The bell crank lever 16 carries at the end of one of its arms a fork 17 which may be engaged with the standard 11 whereby the lower portion of said standard will be held against forward movement. A lock 18 is mounted upon the dash-board 4 of the machine and is provided with a usual locking bolt indicated at 19. A shaft 20 is journaled in the dash-board 4 and carries at its rear end a handle 21. Spaced lugs 22 are carried at the side of the shaft 20 and the bolt 19 may engage between the said lugs 22.

The shaft 20 carries at its forward end a laterally disposed arm or lug 23 and a rod 24 is pivoted at its upper end to the said lug 23 and is pivoted at its lower end to the upper arm of the bell crank lever 16. Consequently it will be seen that when the fork 17 is engaged with the standard 11 the bolt 19 of the lock 18 may be projected between the lug 22 of the shaft 20 and consequently the machine is maintained in a locked position during the absence of the owner. When it is desired to release the machine the bolt 19 is withdrawn from between the lugs 22 whereby the shaft 20 is released and under the influence of the spring 13 the standard 11 and treadle 12 will be elevated or lifted.

The fly wheel 25 of the automobile machine which is mounted upon the propelling shaft in a usual manner is provided with a serrated periphery 26. A bell crank lever 27 is fulcrumed at the forward portion of the body 3 and below the floor thereof and the said bell crank lever carries at the end of one of its arms a shoe 28 which may engage the serrations of the periphery 26 of the fly wheel 25 whereby the said wheel may be held at a stationary position. A link 29 is pivotally connected at one end with the standard 11 and pivotally connected at its other end with one of the arms of the bell crank lever 27 and as the said lever is rocked by the movement of the link 29 and the standard 11 the shoe 28 may be moved into engagement with the periphery of the fly wheel or away from the same. Thus means are provided for locking and for releasing the fly wheel of the automobile machine.

The supply pipe which extends from the oil tank to the carbureter of the automobile machine is provided with a valve 30 which is located in the vicinity of the carbureter. The stem of the said valve is provided with a laterally disposed arm 31, and a link 32 is pivotally connected at one end with the lower portion of the standard 11 and pivotally connected at its other end with the extremity of the arm 31, consequently it will be seen that as the standard 11 is moved as hereinbefore described the link 32 will be moved longitudinally whereby the arm 31 will be swung and the valve 30 will be opened or closed. Consequently means are provided for permitting the gas to flow freely from the tank to the carbureter and the said means may be manipulated for cutting off the supply of fuel, oil or gas from the tank of the carbureter.

When all of the locking devices are applied in their active positions and performing their functions as locking means they may be held at such positions by engaging the bolt 19 of the lock 18 between the lugs. Therefore the automobile machine will be securely locked or secured during the absence of the owner. When the owner desires to release the parts from the locking mechanism the bolt 19 is retracted from between the lugs 20 whereby all of the locking devices are moved so their active parts are withdrawn to inactive positions and consequently the machine is released and is free to be propelled.

From the foregoing description taken in conjunction with the accompanying drawing it will be seen that an automobile locking mechanism of simple and durable structure is provided and that the same may be easily and quickly manipulated for securing the automobile machine against traveling movement and the device may be readily operated to relieve the active parts of the automobile machine.

Having described the invention what is claimed is:—

A lock for an automobile machine comprising brackets adapted to be applied to the frame of the machine, a bar carried by the brackets and provided with an angularly disposed stem, sleeves slidably mounted upon the bar, a collar slidably mounted upon the stem, links operatively connecting the collar with the sleeve, a standard pivotally mounted upon the body of the machine, means for normally holding the standard at a rear position, a link operatively connecting the standard with the collar and means mounted upon the body of the machine for locking the standard against movement.

In testimony whereof we affix our signatures.

JOSEPH A. BEIL.
FRANKLIN J. HOFF.

Copies of this patent may be obtained for five cents each, by addressing the "Commissioner of Patents, Washington, D. C."